US006791704B1

(12) United States Patent
Moreau et al.

(10) Patent No.: US 6,791,704 B1
(45) Date of Patent: Sep. 14, 2004

(54) METHOD AND DEVICE FOR MANAGING PRINTING PRODUCT RESOURCES AVAILABLE IN A PRINTER

(75) Inventors: Jean-Jacques Moreau, Rennes (FR); Mickaël Lorgeoux, Rennes (FR)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/421,263

(22) Filed: Oct. 20, 1999

(30) Foreign Application Priority Data

Oct. 23, 1998 (FR) ........................................... 98 13318

(51) Int. Cl.[7] ............................................... G06F 15/00

(52) U.S. Cl. ...................... 358/1.15; 358/296; 358/298; 399/27

(58) Field of Search ......................... 358/1.1, 1.5, 1.12, 358/1.13, 1.14, 1.15, 296, 298; 399/27; 347/7

(56) References Cited

U.S. PATENT DOCUMENTS

| | | | | |
|---|---|---|---|---|
| 4,413,264 A | | 11/1983 | Cruz-Uribe et al. | 346/1.1 |
| 4,961,088 A | | 10/1990 | Gilliland et al. | 399/25 |
| 5,160,966 A | | 11/1992 | Shiina et al. | 355/206 |
| 5,202,769 A | | 4/1993 | Suzuki | 358/300 |
| 5,508,786 A | | 4/1996 | Ogiri et al. | 355/206 |
| 5,636,032 A | * | 6/1997 | Springett | 358/296 |
| 5,724,627 A | | 3/1998 | Okuno et al. | 399/27 |
| 5,729,351 A | | 3/1998 | Oh | 358/296 |
| 5,794,094 A | | 8/1998 | Boockholdt et al. | 399/27 |
| 5,802,420 A | | 9/1998 | Garr et al. | 399/27 |
| 6,019,461 A | * | 2/2000 | Yoshimura et al. | 347/86 |

FOREIGN PATENT DOCUMENTS

| | | |
|---|---|---|
| EP | 707969 A2 | 4/1996 |
| EP | 707969 A3 | 8/1997 |
| JP | 62-158049 | 7/1987 |
| WO | WO 97/27061 | 7/2003 |

OTHER PUBLICATIONS

Pat. Abs. of Japan, vol. 096, No. 008, Apr. 2, 1996 (JP 08–088706 A).

Pat. Abs. of Japan, vol. 008, No. 022 (M–272), Oct. 24, 1983 (JP 58–181680A).

Pat. Abs. of Japan, vol. 011, No. 342 (P–635), Jun. 6, 1987 (JP 62–125384A).

Pat. Abs. of Japan, vol. 014, No. 132 (M–0948), Jan. 8, 1990 (JP 02–003357A).

Pat. Abs. of Japan, vol. 018, No. 258 (M–1606), Feb. 15, 1994 (JP 06–040011A).

Pat. Abs. of Japan, vol. 081, No. 154 (M–1577), Dec. 14, 1993 (JP 05–330196).

Pat. Abs. of Japan, vol. 097, No. 011, Jul. 22, 1997 (JP 09–187963 A).

Pat. Abs. of Japan, vol. 018, No. 309 (P–1753), Mar. 11, 1994 (JP 06–067507).

Pat. Abs. of Japan, vol. 097, No. 001, Sep. 17, 1996 (JP 08–238780).

* cited by examiner

*Primary Examiner*—Mark Wallerson
(74) *Attorney, Agent, or Firm*—Fitzpatrick, Cella, Harper & Scinto

(57) ABSTRACT

Management of resources of at least one printing product available in a printer includes: predicting a quantity of a printing product necessary for printing a document by a computer connected to the printer; creating a table of limited capacity from digital data representing adjacent bands of the document; before printing the document, measuring a quantity of printing product still available in a corresponding reservoir of the printer; comparing the predicted quantity and the measured quantity; and, if the measured quantity is lower than the predicted quantity, sending a message and/or triggering implementation of a processing before printing the document.

28 Claims, 10 Drawing Sheets

METHOD AND DEVICE FOR MANAGING PRINTING PRODUCT RESOURCES AVAILABLE IN A PRINTER

BACKGROUND OF THE INVENTION

1. Field of the Invention

The invention relates to a method of managing resources of one or more printing products available in a printer, for printing a document stored in the form of digital data, for example in a computer, the latter being able to control said printer, which is associated with it directly or indirectly via a network. The invention also concerns a device for implementing the method.

2. Discussion of Related Art

A computerised printer contains at least one and generally several printing product reservoirs. Some reservoirs can be integrated into one and the same cartridge. For example, a black and white inkjet printer contains a single reservoir of black ink. For a colour printer, other different colour printing products are necessary, notably cyan, magenta and yellow. On certain high-performance printers, it is possible to use printing products with different densities of these three colours. It is also possible to use other colours such as red, blue, green, white, silver and gold. The printing of a document will use all or some of the printing product or products present in the different reservoirs. Obviously, the quantity of a particular printing product used depends notably on the content of the document to be printed. A simple typed document will require a printing product of a single colour, usually black. On the other hand, an illustrated report can contain images and graphs using colours. In this case, the printer will consume at least black, blue, magenta and cyan in variable proportions.

The quantity of printing product consumed also depends on the configuration of the printer at the time of printing. Some printers make it possible to choose one printing mode amongst several possible ones, low, medium or high resolution, both in black and white and in colour. Consequently, the same printer can consume very different quantities of printing products, for the same document stored in digital form, according to the print mode selected.

The quantity of printing product consumed also depends on the physical characteristics of the printing means. It depends notably, for an inkjet printer, on the type of reservoir or cartridge used, the diameter of the ink ejection nozzles on the print head and the very nature of the printing product, the size of the droplets ejected depending on the pigments used, and therefore on the colour.

The quantity of printing product consumed also depends on the characteristics of the paper used. For example, a heavyweight glazed paper will receive a larger quantity of printing product than an ordinary paper.

Finally, it should be noted that the quantity of printing product consumed also depends on the characteristics of the environment: relative humidity, pressure, temperature, etc. These characteristics are unstable by nature and falsify predictions. All the others can be predetermined or known.

U.S. Pat. No. 5,636,032 describes a system for estimating the number of pages which a printer is capable of printing. When the document is stored in the form of digital data, it is converted in order to constitute a table describing a monochromatic component of the document in the form of pixels. Reading such a table makes it possible, in the case of an inkjet printer, to control the ejection of the droplets of liquid printing product at predetermined locations on the sheet of paper, constituting the coordinates of the different pixels. It is said that a pixel is "switched-on" in such a table if the cell corresponding to this pixel contains an item of information indicating that a droplet of printing product must be ejected at this pixel location.

According to the teachings of this prior patent, at the very moment of printing of one of the pages, the number of switched-on pixels in this page is counted and the or each quantity of printing product used for printing is deduced. To this end, for each ink reservoir which can be used by the printer, the mean volume of ink necessary for printing a pixel has been stored. However, the process can produce only a relatively imprecise estimation of the quantities needed since it is implemented simultaneously with the printing of a page. Estimation therefore assumes that all the pages which remain to be printed will require the same quantity of the printing product as the previous one. Such is not always the case, in practice.

Independently of such an estimation process, some printers are provided with means of measuring the or each quantity of printing product available in a reservoir or cartridge compartment in the course of use. Such a printer is for example described in the application PCT 97/00366. If the printer is connected to a computer, the measurements can be transmitted to it via an interface card and can be processed and/or displayed on a control screen of this computer.

SUMMARY OF THE INVENTION

The main object of the invention is to improve the management of the resources of one or more printing products used by the printer, notably in connection with the computer, by combining the advantages of a prediction of the or each quantity of printing product necessary for printing a document and an actual measurement of the or each quantity of printing product available in the reservoir or reservoirs of the printer at the moment when it is wished to print.

More precisely, the invention concerns a method of managing the resources of at least one printing product available in a printer, characterised in that it consists of predicting the quantity of said printing product necessary for printing a document stored in the form of digital data by describing this document by pixels and counting the switched-on pixels corresponding to said printing product, also measuring, before printing, the quantity of printing product actually available in a corresponding reservoir of said printer, comparing the predicted quantity and the measured quantity and, according to this comparison, at least sending a message and/or triggering the implementation of a processing.

Amongst the messages which can be displayed, there can be mentioned not only the prediction itself of the quantities of printing products necessary for printing a document under consideration but also, by comparison with the available quantity or quantities, information on the possibility or impossibility of actually printing the document without having to change at least one reservoir. The information broadcast can also indicate the number of copies of the document which is possible to print without having to change at least one reservoir, or, failing this, the number of the page of the document or of the $n^{th}$ copy which it will be possible to print without intervention.

Amongst the processings which it is possible to envisage from the comparison of the predicted quantities and the measured quantities, it is notably possible to mention the prohibition on printing or the automatic change to an economical printing mode making it possible to satisfy the user requirement. In addition, as will be seen later, correction factors can be produced and used so that a predicted quantity is as close as possible to a measured quantity of an actual consumption of a printing product. The comparison can therefore automatically and unbeknown to the user trigger the implementation of a processing updating the correction factor or factors. These correction factors make it possible notably to take into account overall the characteristics which have an influence on the quantity of printing product consumed and which are unstable or impossible to parameterize, notably the environmental characteristics (relative humidity, pressure, temperature, etc) and the usual tolerances of the components, such as for example the diameter of the ejection nozzles, or the degree of filling of a reservoir.

The method which has just been set out can preferably be essentially implemented in a computer connected to a printer. Moreover, it is more and more frequent to use computers in a network. Under these conditions, if a computer contains a document stored in digital form, it will be possible to have this document printed by a specific printer connected to another computer in the network. The prediction can be calculated by the computer containing the document before the latter is transmitted to the other computer specifically connected to the printer in question. In this case, the necessary parameters relating to the characteristics of the printer and the printing products and those relating to those of the printing mode can be exchanged by the network between the computers. In the same way, the correction factors and the levels can be exchanged between computers.

In order to prevent the representation of the monochromatic component or components of said document in the form of pixels occupying excessively large amounts of space in the memory of the computer, the method according to the invention is supplemented by the fact that an aforementioned table of limited capacity is created, less than the capacity necessary for describing the monochromatic component or components of said document. Groups of pixels of said monochromatic component are entered therein successively and the number of switched-on pixels is counted each time until all of said monochromatic component has been entered in said table and all its switched-on pixels have been counted.

Preferably, each table of limited capacity is created from digital data representing adjacent bands of the document.

In order to apply, to the digital data represented in the form of pixels, corrections which are desirable for printing, by using known correction algorithms, the method according to the invention makes provision for selecting broadened bands, overlapping, of said document. From digital data corresponding to these broadened bands, at least one enlarged table is created, allowing an image reprocessing entailing a modification of the illuminated pixels. Consequently, the enlarged table is modified by applying a known correction algorithm and the counting of the switched-on pixels corresponding to the excess part of the enlarged table, that is to say the overlapping part of the bands, is excluded.

In the case of a colour printing, as many enlarged tables as there are colours are created, each describing a monochromatic component of the document. A correction algorithm is applied, in a manner known per se, to each table in order to separately count the switched-on pixels so as to predict the different quantities of printing products necessary, of all the colours concerned, for printing part of the document corresponding to the band. After which the tables, reset to zero, receives the pixels of the following band.

When the switched-on pixels have been counted, it suffices to multiply their number by a value representing an elementary quantity of the printing product. In the case of an inkjet printer, the value in question represents the value of a droplet of printing product ejected each time by the print head. Obviously, this value depends on the print product, as indicated previously. It also depends on the type of printer and/or on the type of print head. A computer can easily contain in memory a set of such values taking into account all the equipment and products available on the market and it will be in a position to measure one of them according to an actual combination of such parameters.

With regard to the actual measurement of the quantity or quantities of printing products available in the corresponding reservoir or reservoirs, it will be possible, for each reservoir, to arrange a capacitive arm including said reservoir, apply an alternating signal to this capacitive arm and analyse a resulting signal in order to derive therefrom the said quantity of printing product actually available in this reservoir.

In addition, the successive measurements of the quantity or quantities of printing product actually available can be used for improving the prediction process.

To do this, the method is also characterised in that it consists of allocating a correction factor to the quantity or quantities of printing product predicted for the printing of a document, respectively, comparing, after actual printing of the corresponding document, the quantity or quantities predicted with the quantity or quantities or product actually consumed, respectively, reupdating the correction factor or factors in order to make the predicted quantity or quantities correspond to the quantity or quantities consumed, and using the new correction factor or factors for the following prediction.

Moreover, the user may be led to remove from the printer a reservoir still containing a certain quantity of printing product and replacing it with another similar reservoir containing another printing product, for example in order to print in a different colour. The invention makes it possible to manage the use of all these reservoirs for a total use of the printing products which they contain, also make it possible to recognise them automatically when they are reinstalled on the printer.

More precisely, the method is characterised in that it also consists of storing the quantities of printing products contained in several interchangeable reservoirs and the corresponding correction factors, measuring the quantity or quantities of printing product available, for example, before printing a document, comparing the stored quantity or quantities with the corresponding measured quantity or quantities if at least one difference appears, determining whether the measured quantity or quantities correspond to a reservoir or cartridge already used and, in the affirmative, reusing the corresponding correction factor or factors.

The method can be implemented at least partly in the computer connected to the printer. Where several computers are connected in the network and the printer is connected to one of them, the method can be implemented partly in the computer connected to the printer and partly in a second computer connected by the network to the first computer, this second computer being one which has in memory a document to be printed. For example, the method can be characterised in that said first computer (connected to the printer) contains in memory the quantity or quantities of printing products actually available and the correction factor or factors, and in that it implements the operations of measuring the quantity or quantities of printing product available as well as the operations of reupdating the corresponding correction factors, and in that said second computer implements the operations of predicting the quantity or quantities of printing products for printing said document, the operations for producing the information necessary for printing the document and the operations for transmitting this information via said network and said first computer. The necessary data are exchanged by the network between the two computers.

Naturally, the invention also concerns a device for managing the resources of at least one printing product available in a printer, characterised in that, it comprises means of predicting the quantity of said printing product necessary for printing a document stored in the form of digital data, these prediction means describing this document by pixels and counting the illuminated pixels corresponding to said printing product, means for measuring, before printing, the quantity of printing product actually available in a corresponding reservoir of said printer, means for comparing the predicted quantity and the measured quantity and means for at least sending a message and/or triggering the implementation of a processor, according to this comparison.

BRIEF DESCRIPTION OF THE DRAWINGS

The invention will be understood more clearly from the description which follows of a computer system comprising a printer and at least one computer equipped and programmed to implement the invention, given solely by way of example and made with reference to the accompanying drawings, in which.

DETAILED DESCRIPTION OF THE INVENTION

Figure 1:
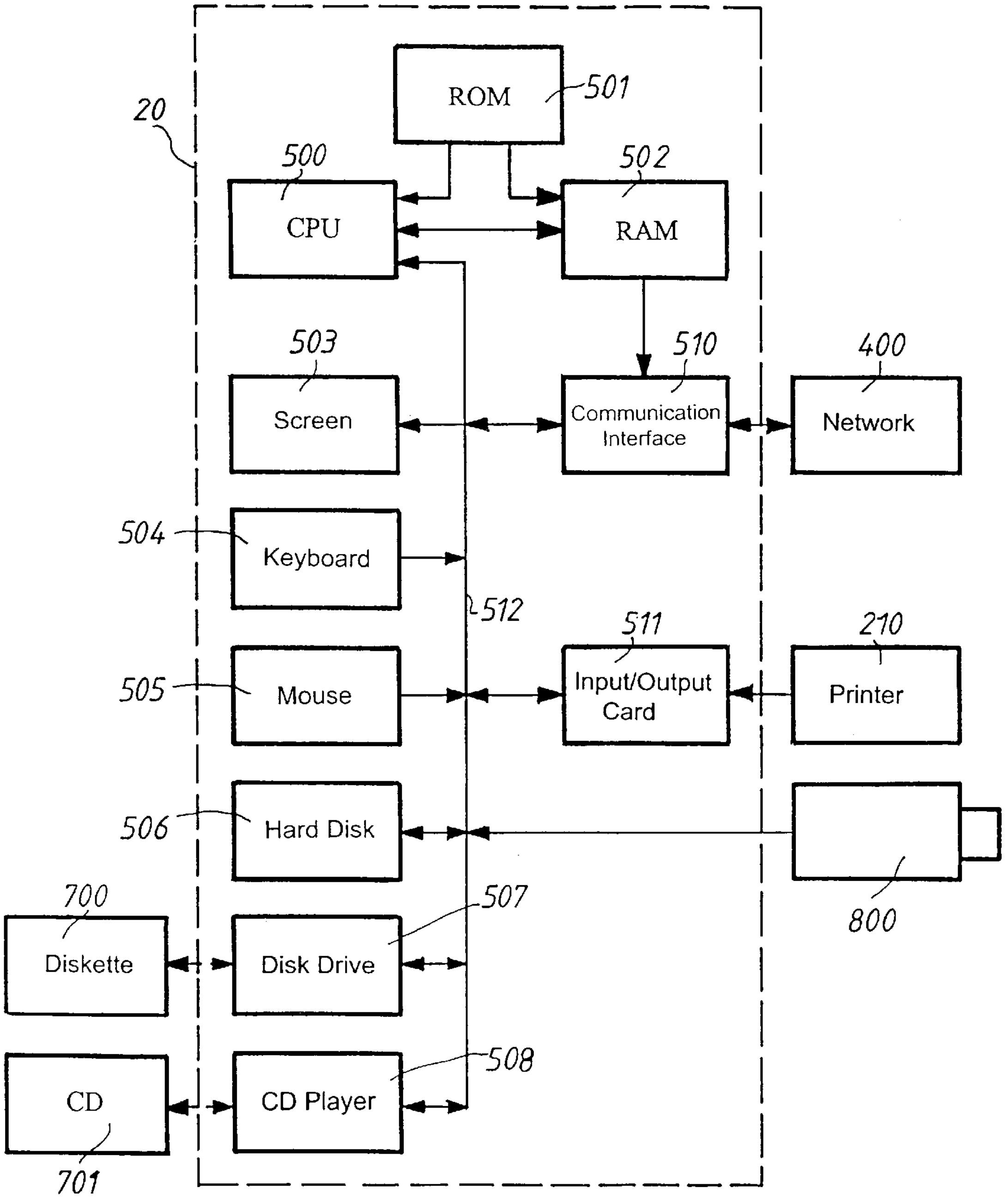
FIG. 1 is a block diagram of a computer/printer assembly implementing the invention.

FIG. 1 depicts a computer 20 connected to different peripherals including notably a printer 210. The computer has a communication interface 510 connected to a communication network 400 by means of which it can notably exchange information with other computers. It also has a storage means 506 referred to as a "hard disk", a disk drive 507 and a "CD" disc player 508. This drive and player can also respectively receive a diskette 700 and a CD 701. These elements, as well as the hard disk 506, can contain documents within the meaning of the invention, as well as the code for implementing the invention which, once read by the computer 20, will be stored on the hard disk 506. According to a variant, the program enabling the computer to implement the invention can be stored in read only memory 501 (designated ROM in FIG. 1). According to another possible variant, the programme can be loaded as required in order to be stored in an identical fashion to that described previously, by means of the network 400.

The computer is supplemented by a screen 503 for displaying the documents to be printed, for serving as an interface with the user who wishes to modify these documents, using a keyboard 504 and/or a mouse 505 or any other control means. The screen 503 also makes it possible, at the request of the user, to display the volumes of the different printing products which will be liable to be consumed by the printer 210 if a document available in the form of digital information in the computer or one of its peripherals is to be printed. The instructions relating to the implementation of the method according to the invention will be executed by the central unit 500 (CPU in FIG. 1). The instructions will be stored in the read only memory 501 or in the other available storage elements. On powering up, the programs relating notably to the implementation of the invention, stored in one of the non-volatile memories, such as for example the read only memory 501, are transferred into a random access memory 502 (RAM in FIG. 1), which then contains the executable code of the invention as well as the variables and parameters necessary for its implementation.

The different sub-systems of the computer 20 which have just been mentioned exchange information with each other by means of a communication bus 512, which also makes it possible, by virtue of the interface 510, to convey information coming from the network 400 or to transmit information to this network. Where it is a case of the possible reproduction of images, a digital camera 800 can be connected to the bus 512.

Figure 2:
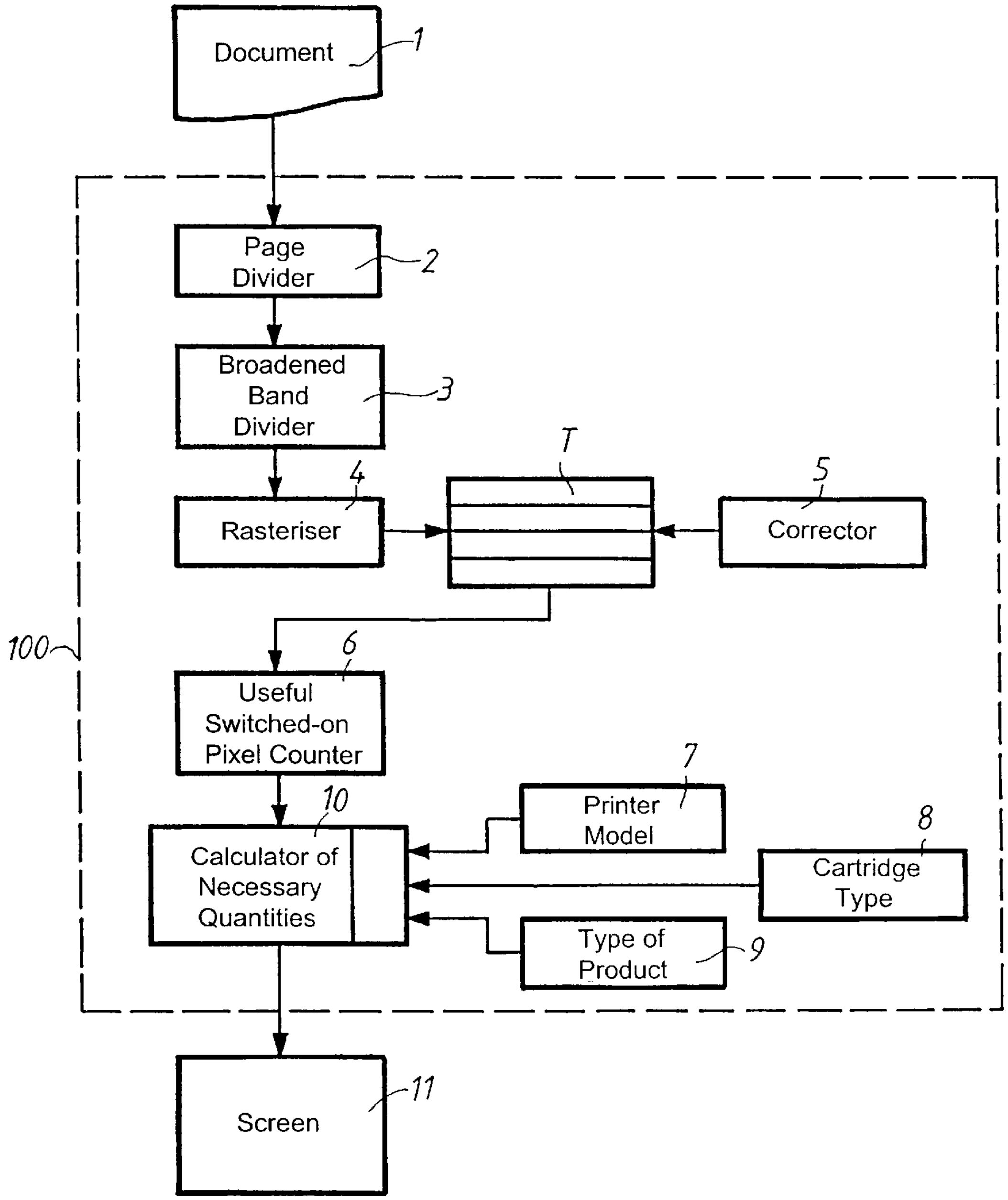
FIG. 2 is a block diagram of the means specific to the implementation to the invention for predicting the quantity or quantities of printing product necessary for printing a document stored in the form of digital data.

FIG. 2 depicts a functional block diagram of a device 100 able to implement the process of predicting the quantity or quantities of printing product necessary for printing a document as soon as it is functionally interposed between a file 1 containing the document in the form of digital information and a screen 11 able to display the results, that is to say the quantities of the printing products necessary for printing the document stored in the file 1. The device can, as has been seen, be represented concretely by the computer, it can also be produced in a form of a self-contained unit housed in the printer itself or forming part of an interface circuit. The device has a page divider 2 responsible for dividing up the electronic document stored in the file 1 into groups of information, each group representing a page. Each page includes a more or less large part of the document according to the format chosen for reproduction, the dimension of the sheets of paper, etc. The information representing each page is then divided up into broadened bands by a broadened band divider 3. It should be stated that such a broadened band consists of the digital information representing a band of the page under consideration increased by an overlap margin belonging to the following band. The broadened band information determined by the divider 3 are transmitted to a conversion system, referred to as a "rasteriser" 4, which transforms the digital information transmitted by the divider 3 into at least one table T describing part of a monochromatic component of the document, each cell of the table representing a pixel. More precisely, each cell of the table (memory) contains the coordinates of a pixel and an item of information representing the fact that this pixel is "switched on" or not. In the example, the part of the monochromatic component is the one which corresponds to the broadened band in the course of processing. If the document to be printed is black and white, the rasteriser generates and fills a single table. If it is in colour, the rasteriser 4 generates as many tables as there are monochromatic components necessary for printing the document. The table T is then subjected to the action of a corrector 5 able to apply, to the table or tables, a correction involving modifications to the switched-on pixels, making it possible to improve the quality of the document to be printed. The corrector 5 uses known algorithms. When the corrector has applied such algorithms, in order to modify the illuminated pixels in the different tables T, these are read and the so-called illuminated pixels are counted by an illuminated pixel counter 6. It should be noted that this counter counts only the "useful" illuminated pixels of the table or tables, that is to say the pixels corresponding to the band under consideration, not including the margin of overlap with the following band. The results of this counting or countings are sent to a printing product volume calculator, which multiplies the number of illuminated pixels in each table by a predetermined quantity calculated from information selected in memories 7, 8 and 9.

For example, the memory 7 makes it possible to select a parameter representing the model of printer. The memory 8 makes it possible to select a parameter representing the type of cartridge. The memory 9 makes it possible to select a parameter representing the printing product used. In the case of an ink jet printing apparatus, for example, the parameter which can be selected by memory 9 is determined as the one which would correspond to the discharge quantity of ink determined by various conditions of ink such as type, composition, viscosity, etc All of these parameters taken together make it possible to calculate the mean volume of a droplet or printing product ejected at the location of each illuminated pixel. The calculator 10 determines the volumes of the corresponding printing products and, when all the bands on all the pages of the document have been analysed, the calculator 10 can demand the display, on the screen 11, of the volumes of the different printing products necessary for printing each page, on the one hand, and the entire document on the other hand.

Figure 3:
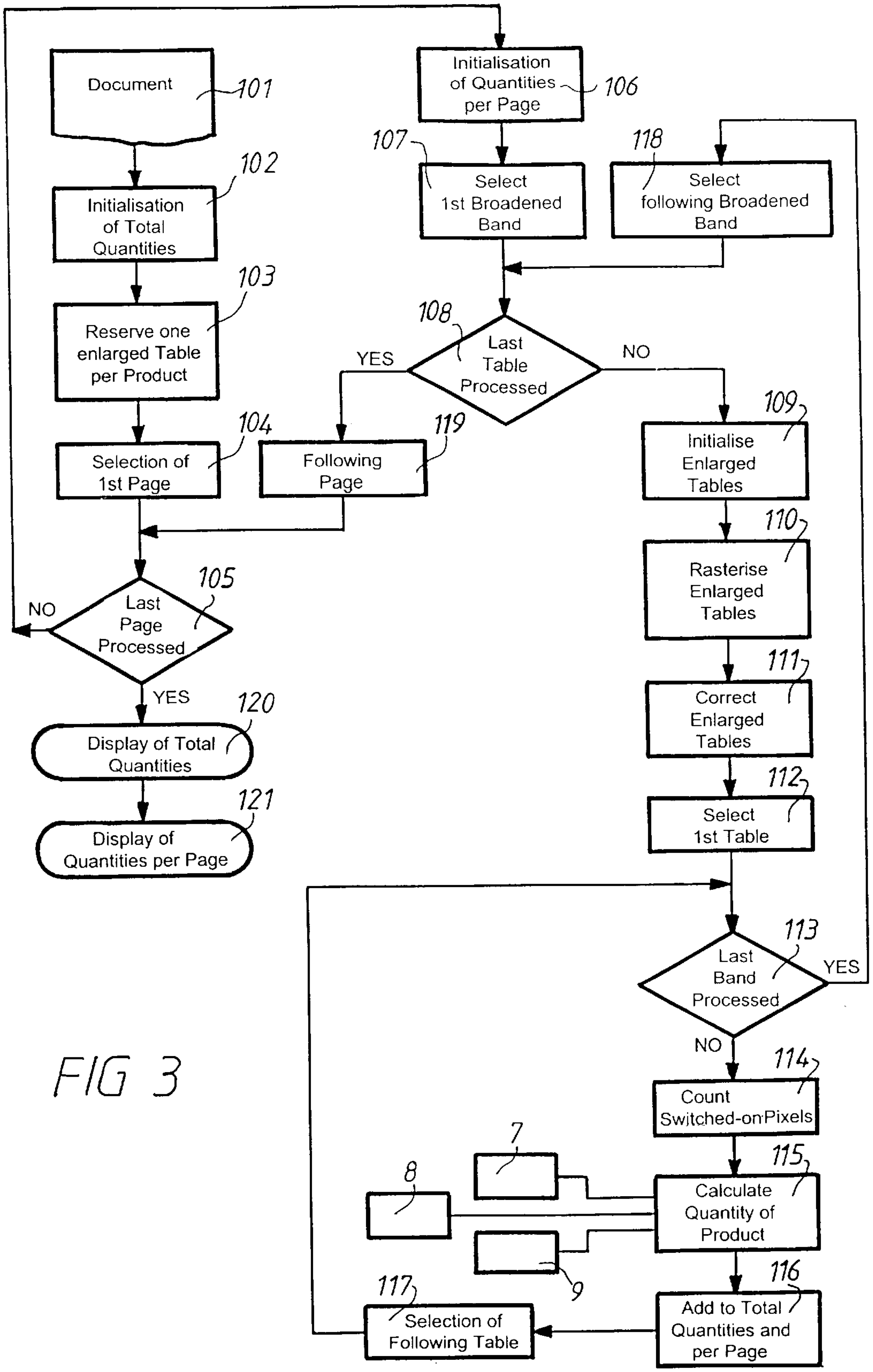
FIG. 3 is a flow diagram describing the implementation of the prediction method.

FIG. 3 is a flow diagram describing more precisely the operations performed during the implementation of the prediction process, for example by means of the computer of FIG. 1 connected to its printer 210 or to a printer accessible through the network 400 via another computer. The starting point is a file 101 in which the document to be printed is stored in the form of digital data.

The following step 102 consists of initialising the total volumes of the printing products in a memory which will be consulted for the final display. The following step 103 consists of reserving, in the system, the memory capacity necessary for creating as many enlarged tables as are needed different printing products for printing the document.

Step 104 consists of selecting a first page from the digital information contained in the file 101.

Step 105 is a test for checking whether the last page has been processed.

If the response is no, step 106 of initialising quantities of printing products necessary for a page is passed to, in a memory reserved for this purpose, which will be consulted for the final display.

The following step 107 consists of selecting a first broadened band in this page.

Step 108 is a test for determining whether all the bands on the page have been processed.

If the response is no, step 109 is passed to, which consists of initialising all the enlarged tables, corresponding to the different monochromatic components of the band.

The following step 110 (rasterisation) consists of filling all the enlarged tables corresponding respectively to the monochromatic components of the broadened band being processed.

Step 111 consists of applying the correction algorithms to all the enlarged tables of said broadened band.

Step 112 consists of choosing one of these tables with a view to counting its switched-on pixels.

Step 113 is a test which checks whether all the tables corresponding to a broadened band have been processed.

If the response is no, step 114 is passed through, which consists of counting the "useful" pixels of the table under consideration.

Step 115 consists of calculating the corresponding quantity of printing product. This calculation takes account of the values of the parameters selected in different memories 7, 8 and 9 as in the case of FIG. 2, in order to take account of the model of printer, the type of cartridge used and the printing product itself.

Step 116 consists of adding the quantity calculated at operation 115 to the quantity previously counted and added.

At step 117, the following enlarged table is selected and step 113 is returned to.

When all the tables have been processed, the response to test 113 becomes positive and step 118 is passed to, consisting of selecting the following broadened band before returning to test 108.

When the response to test 108 becomes positive, this means that all the page has been tested and step 119 is passed to, which consists of processing the following page, returning to test 105.

When all the pages have been processed, test 105 becomes positive and it is then possible to display the total quantities (step 120) of all the printing products necessary for printing the entire document as well as the partial quantities (step 121) indicating the corresponding quantities necessary for printing each page.

Figure 4:
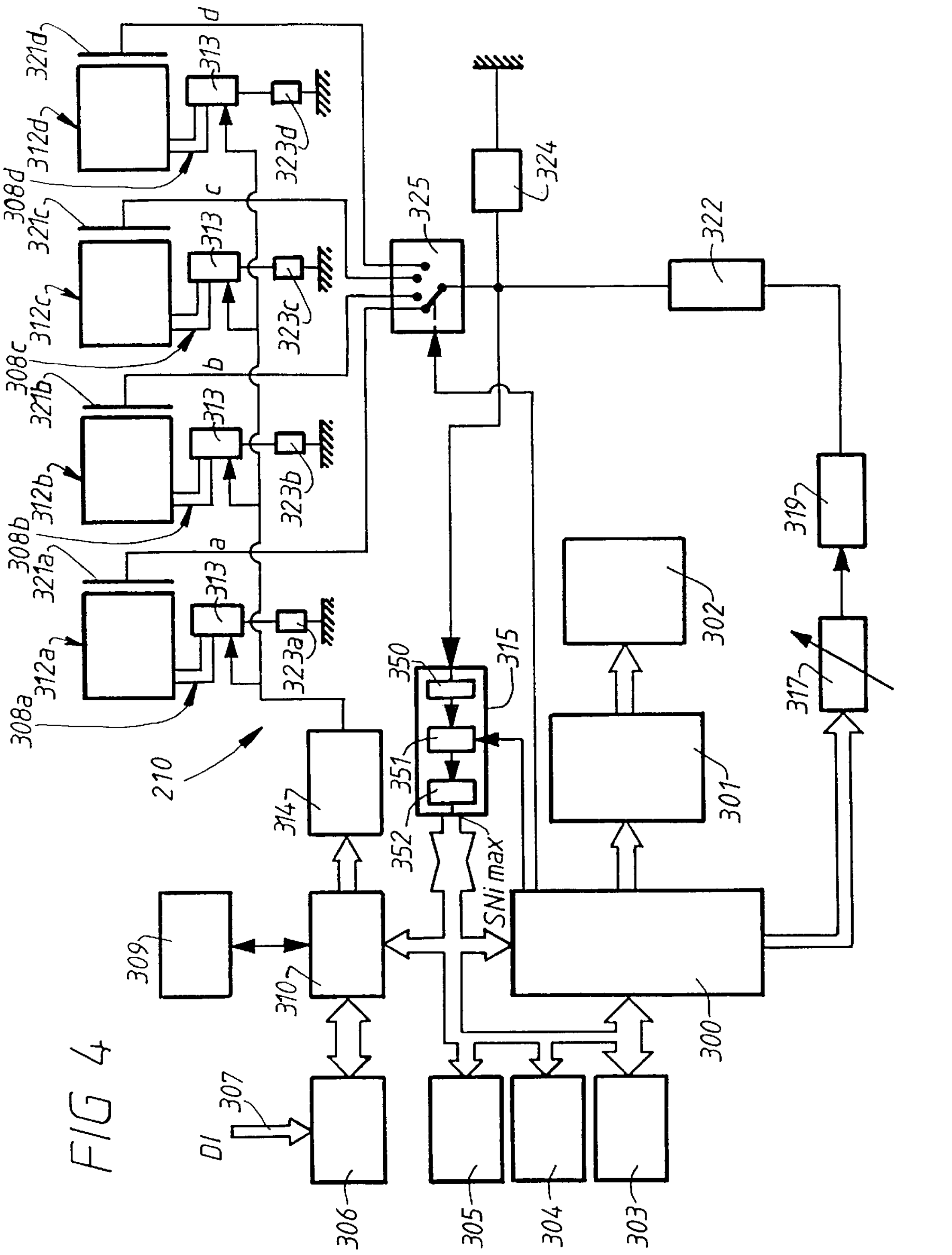
FIG. 4 is a block diagram of a printer incorporating means of measuring the actual quantity of printing product contained in each reservoir.

Considering more particularly FIG. 4, the printer 210 is depicted, which is here a colour printer receiving data to be printed DI representing a text or an image, by means of a parallel input/output port 307, connected to an interface circuit 306, itself connected to an ink ejection control circuit 310 which controls the print heads 313*a*, 313*b*, 313*c*, 313*d* via an amplification circuit 314. The printer is connected to the microcomputer by the parallel port and said microcomputer is connected to the network 400. The print heads are respectively connected to printing product reservoirs 312*a*, 312*b*, 312*c*, 312*d*. According to the example, each reservoir is connected by a duct to the corresponding print head 313*a*–313*d* which is electrically connected to earth by means of a resistor 323*a*–323*d* of low value. The reservoir 312*a* contains a black printing product for monochrome or four-colour printing. The reservoirs 312*b*, 312*c*, 312*d* contain printing products of different colours, for colour printing. The three colours are conventionally magenta, cyan and yellow.

In the example, the reservoirs 312*a*–312*d* and the print heads 313*a*–313*d* are mounted on a carriage compelled to move along guidance means formed by parallel rods and rails. The carriage is moved in a reciprocating motion along these guidance means. It is driven by a motor 302, by means of a belt mechanism, well known to persons skilled in the art. The movement path of the carriage and therefore of the print heads 313*a*–313*b* is parallel to a line to be printed on a printing medium such as a sheet of paper. This printing medium is moved at right angles to the movement path of the carriage by the printer mechanism, known per se.

The printer also has a main data processing circuit 300 associated with a read only memory 303 and a random access memory 309. The read only memory 303 contains the operating programs of the main processing circuit whilst the random access memory 309, also associated with the printing product ejection control circuit 310, temporarily stores the data received by means of the interface 306 as well as the data produced by the main processing circuit 300. The latter is connected to a display 304 on which it controls the display of messages indicating the functioning of the printer in general, and in particular, as will be seen subsequently, information on the quantity of printing products remaining in the reservoir. This information can of course be transmitted to the computer in order to be displayed on the screen 503.

The main processing circuit 300 is connected to a keyboard 305 by means of which the user can transmit operating commands to the printer. The processing circuit also controls the motor 302 which drives the carriage, by means of an amplification circuit 301. This motor is here advantageously of the stepping type.

Means of measuring the quantities of printing products contained in the different reservoirs comprise a capacitive arrangement 308*a*–308*b*, selected by means of a selector 325, comprising a reservoir and a corresponding print head as well as a metallic plate 321*a*, 321*b*, 321*c*, 321*d* constituting one of the plates of a capacitor including the corresponding reservoir.

More precisely, it can be considered that this metallic plate 321*a*–321*d* constitutes, from the electrical point of view, the plate of a capacitor connected to an extremum detector of the detection and measurement means 315 of the printer. These are composed more particularly, mounted in cascade, of an amplifier 350 whose input is connected to the plate 321, an extremum detector 351 controlled by the main processing circuit 300, notably for resetting it to zero, and an analogue to digital converter 352 whose output communicates with the main processing circuit 300. The latter is programmed to detect and store a digital value delivered by the converter 352 and representing a signal extremum applied to the input of the amplifier 350 after reinitialisation of the extremum detector 351.

A resonant circuit comprises an adjustable-frequency oscillator 317, controlled by the main processing circuit 300, whose output is connected to an amplifier 319 which applies signals, through a resistor 322, to the resonant circuit comprising an inductor 324 and a selected capacitive arrangement 308*a*–308*d* including the plate 321*a*–321*d*, the reservoir 312*a*–312*d* and its conductive printing product, the print head 313*a*–313*d* connected to the reservoir and the low-value resistor 323*a*–323*d* connected to earth. The whole forms, from an electrical point of view, a capacitive arm equivalent from an electrical point of view to two capacitors and a resistor connected in series. Thus such a capacitor is formed by the plate 321, by the insulating wall of the reservoir 312 as a dielectric and by the printing product contained in the reservoir as a second plate of the capacitor. Moreover, the print head 313 has a dielectric part and a conductive part which form the other capacitor, this being connected to earth by the low-value resistor 323. The different plates 321*a*–321*d* are connected to the input of the detector 315 and to the other constituents of the resonant circuit by the selector 325 controlled by the circuit 300. By this means, it is possible to put each capacitive arm into service successively.

Each measurement of a quantity of product actually available in a reservoir consists for example of applying an alternating signal to one of the capacitive arms connected to the rest of the resonant circuit, seeking the resonance conditions and analysing a resulting signal applied to the input of the detection and measurement means 315 in order to derive therefrom the quantity of printing product available in this reservoir. In the present invention, the means for detecting the quantity of ink are not limited to the structure show in FIG. 4. It is also possible to adopt other means for detecting the quantity of ink in a reservoir.

Considering now more particularly FIGS. 5 to 8, a description will now be given of the main information which it is possible to obtain by the use, according to the invention, of the means which has just been described.

Figure 5:
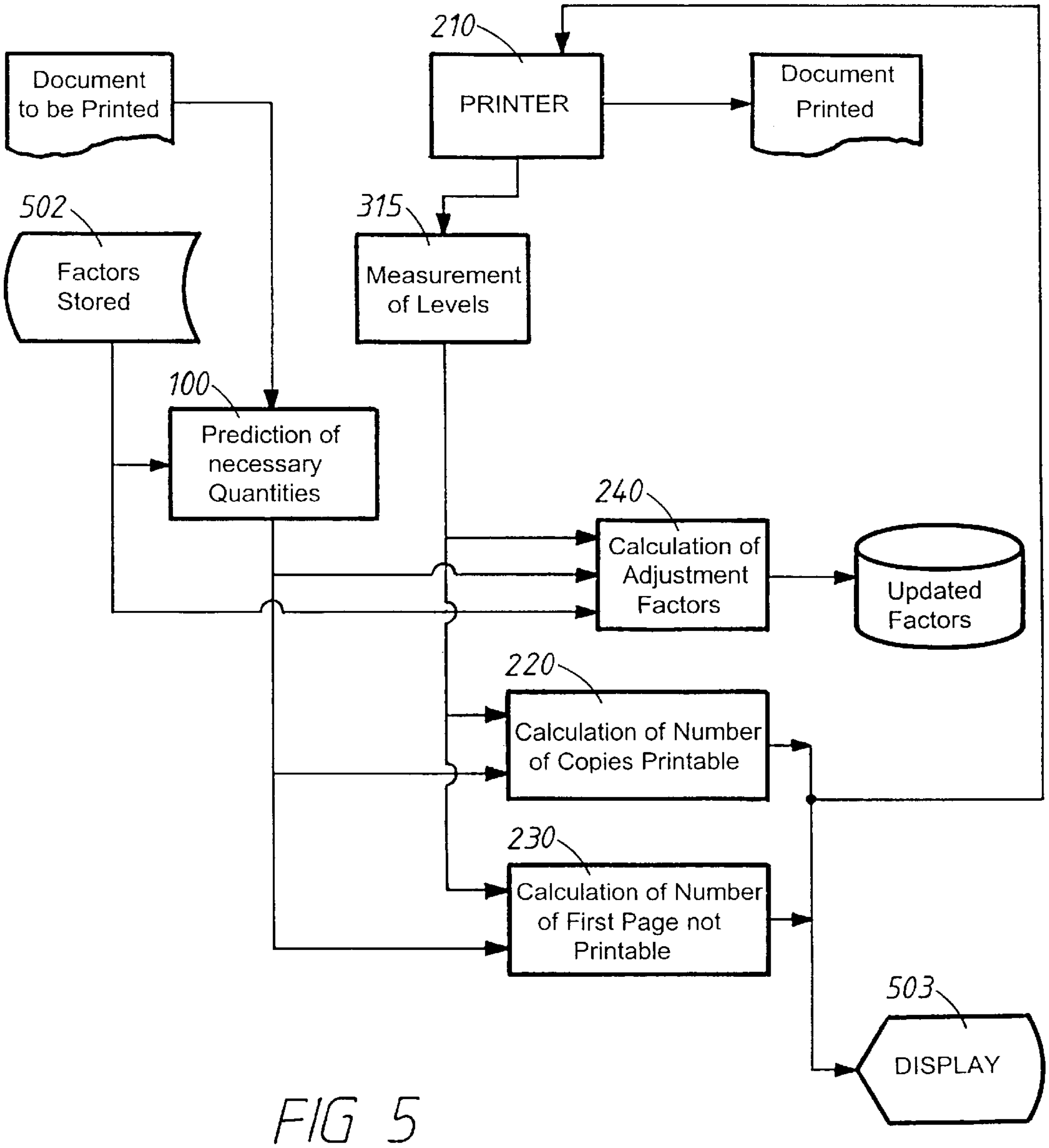
FIG. 5 is a block diagram representing means making it possibly to predict the quantity of ink necessary for the printing of a document, to calculate the number of copies of this same document which can be printed without changing reservoir, and to determine the page which it will not be possible to print completely for lack of at least one necessary covering product.
Figure 6:
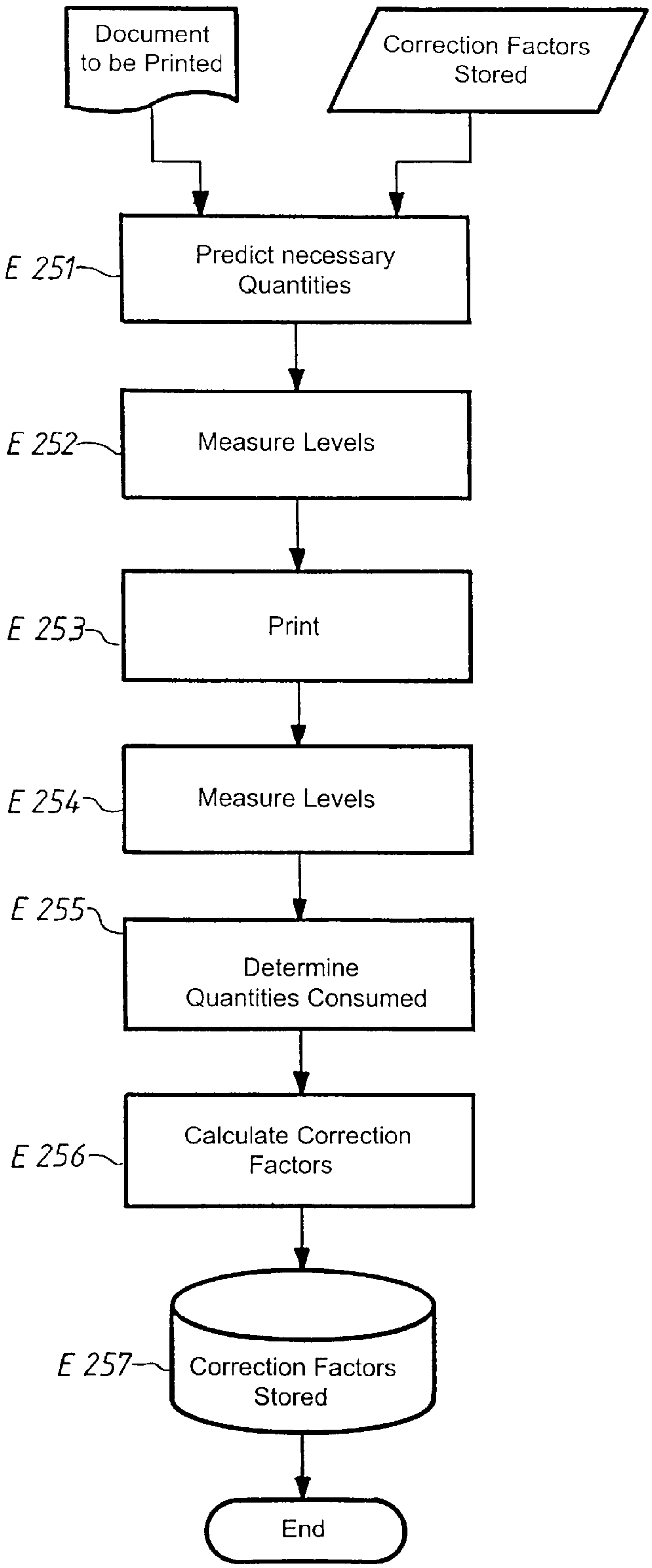
FIG. 6 is a flow diagram describing the process of adjusting the system for predicting a quantity of printing product necessary.

In FIG. 5, the starting point is a document to be printed contained for example in the computer 20 in the form of digital data with a view to obtaining a printed document produced by the printer 210. The means 100 of predicting the quantities of ink necessary consist of the computer 20 and the specific programs which it contains. Amongst these, there is notably a software package 220 for calculating the number of copies of any one document which the printer 210 will be capable of supplying without action on the printing product reservoirs which it contains. The system also includes a software package 230 for determining the number of the first page of the document or of the first page of the $n^{th}$ copy which it will not be possible to print normally because of the exhaustion of at least one printing product. All these calculated data can be displayed on the screen 503.

For using these software, several measurements of the quantities of printing products available are necessary at given times. The measurement means were described in detail with reference to FIG. 4. In FIG. 5, they are represented by the circuit 315, which transmits the information representing the quantity available in each reservoir, in succession. In addition, the system 100 of predicting the quantities of printing products necessary for the printing of the document is used. These means were described with reference to FIG. 2.

On the basis of the prediction of the necessary quantities and a series of measurements of the levels (315) before printing, the software 220, by a simple comparison of the two series of data, will be in a position to determine whether at least one copy of the printed document can be produced by the printer 210 and will display this information on the screen 503. If the quantities of printing product so allow, it will also be able to indicate the number of copies which it is possible to print.

Figure 7:
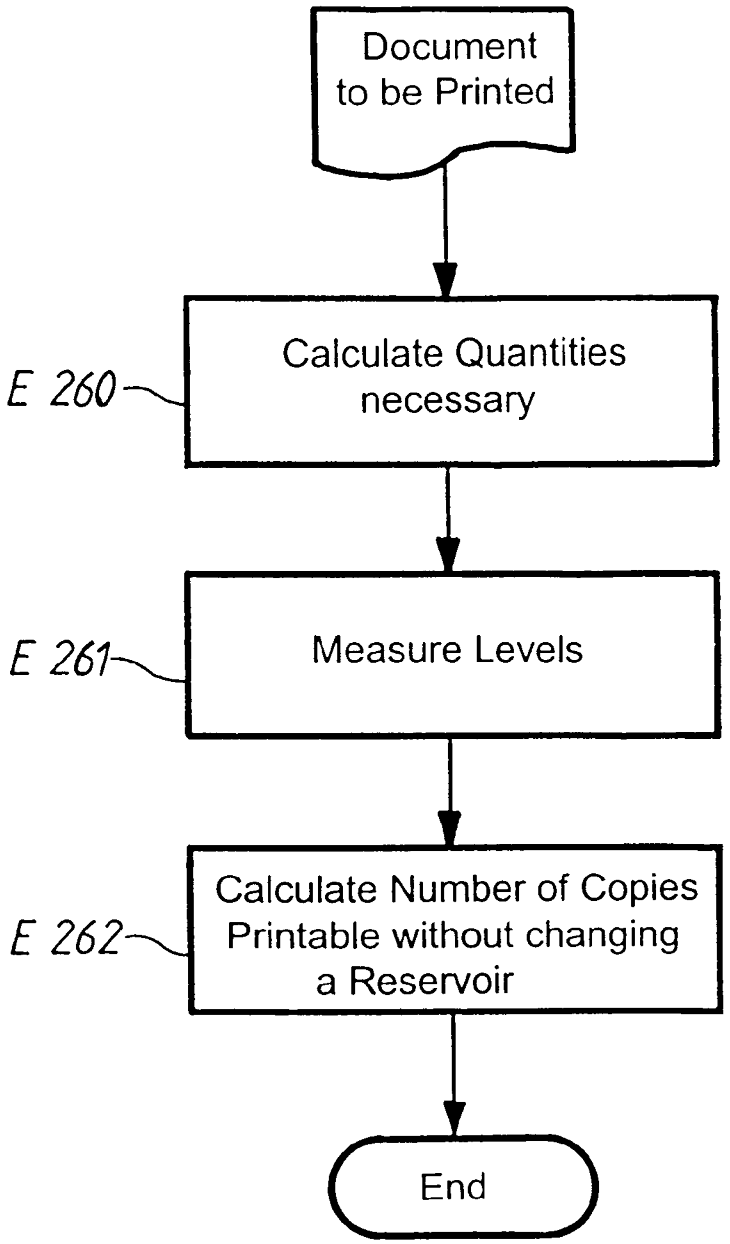
FIG. 7 is a flow diagram describing the process of calculating the number of copies of any one document which can be printed without changing reservoir.
Figure 8:
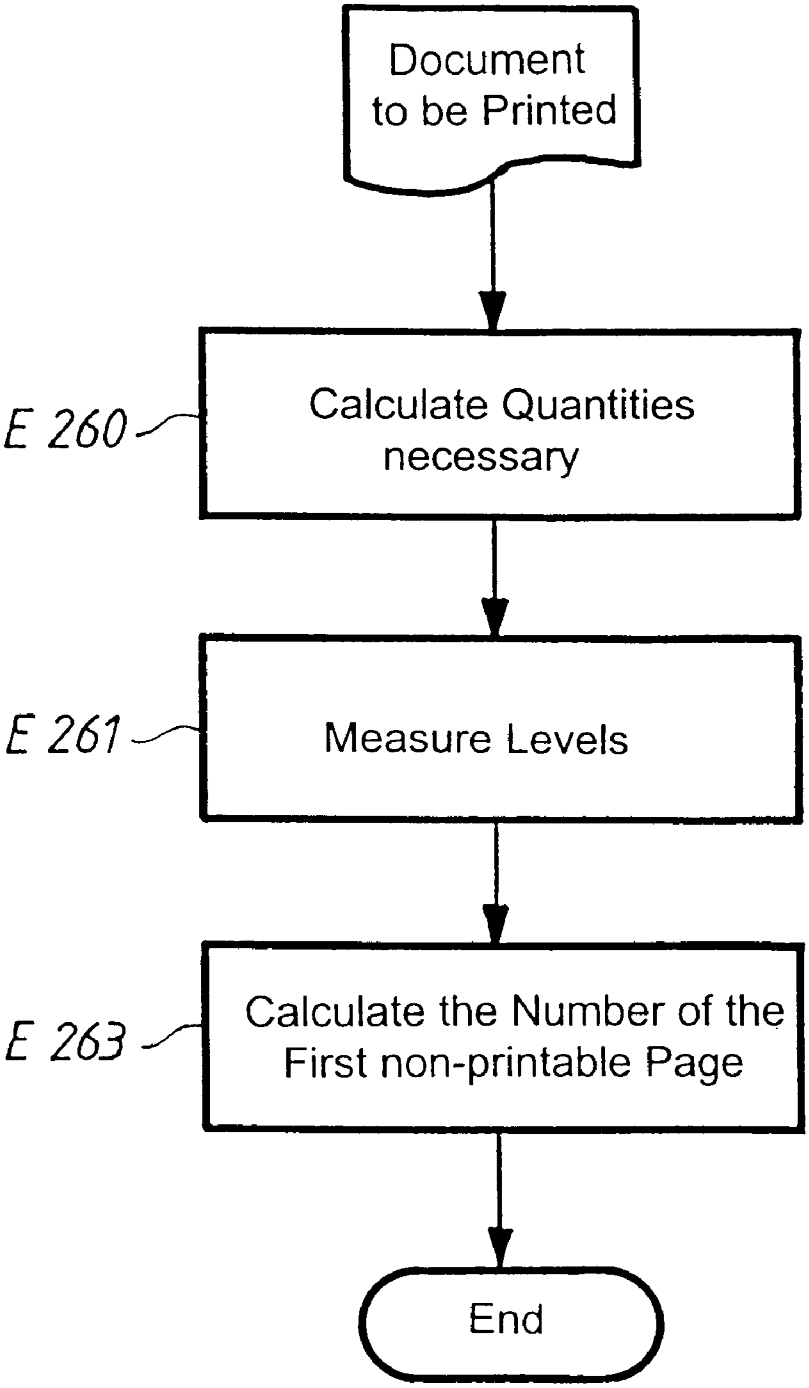
FIG. 8 is a flow diagram describing the process of determining the first page of a document which it will not be possible to print because of the lack of at least one required printing product.

In addition, on the basis of the same predictions and the same measurements of level, the software 230, since the prediction system 100 is capable of supplying the predictions page by page, will be capable, by simply comparing the information supplied, of determining the number of the first page which it will not be possible to print normally. The first page means a page of an $n^{th}$ copy. Setting up the software 220 and 230 is within the capability of a person skilled in the art. FIGS. 7 and 8 illustrate the flow diagrams of the corresponding operations.

Considering FIG. 7, the document to be printed being stored, the necessary quantities of corresponding printing products are calculated at E260. Then, at E261, the levels are measured in the reservoirs. At 262, it is deduced not only if it is possible to print the document but also the number of copies which it is possible to print without changing a reservoir.

Considering FIG. 8, the document to be printed being stored, the necessary quantities of corresponding printing products are calculated at E260. Then, at E261, the levels in the reservoirs are measured. At E263 it is deduced not only if it is possible to print the document but also the number of the first page of the $n^{th}$ copy which it will not be possible to print correctly.

The system described in FIG. 5 also makes it possible to improve the quality of a prediction of the necessary quantities, that is to say the accuracy of the system 100. This is because, as mentioned previously, it is not possible to take account objectively of certain factors which have an influence on the actual consumption of printing products, notably the temperature, atmospheric pressure and relative humidity. The difference between the reservoirs in the case of changing one of them can be added to this. In order to take account overall of these parameters, the invention makes provision for storing and keeping up to date the correction factors for the quantity or quantities of printing product predicted, able to be applied (multiplied) to the results produced by the prediction means 100. Typically, such correction factors can change between 0.8 and 1.2. They are for example stored in the memory 502. These factors are multiplied with the results of the predictions produced by the system 100, each time these results are called up by one of the software packages 220 or 230. The updating of these correction factors is performed by a software package 240. For its functioning, the software 240 requires correction factors as stored, predictions produced by the system 100 (and corrected by the aforementioned correction factors) and two series of measurements of quantities available in the printer, performed successively before and after the actual printing of a document. The use of the software 240 results in the calculation of new correction factors, which are put back in the memory 502. The use of the software 240 is illustrated in the flow diagram in FIG. 6. The starting point is the document to be printed stored in the form of digital data and correction factors stored lastly. From these data, it is possible, at E 251, to effect a precise prediction of the volumes of the different printing products necessary for printing the document. Before printing, at E 252, the actual available levels of the necessary printing products are measured. This measurement is in any event essential for the use of the software 220 and 230. If possible, the document is printed, at E 253.

At E 254, there is effected a new series of measurements of the levels of printing products necessary after complete printing of a document (before the possible printing of other copies). By subtraction, term by term, of the two series of measurements before and after printing at E 255, it is possible to know the exact quantity of each printing product which was necessary for printing the document. By comparing these quantities with the corresponding predicted quantities, it is possible, at E 256, to reupdate each correction factor in order to cause each predicted quantity to correspond to each consumed quantity. These correction factors are next stored (E 257) in the memory 502 and will be used for the following prediction.

Figure 9:
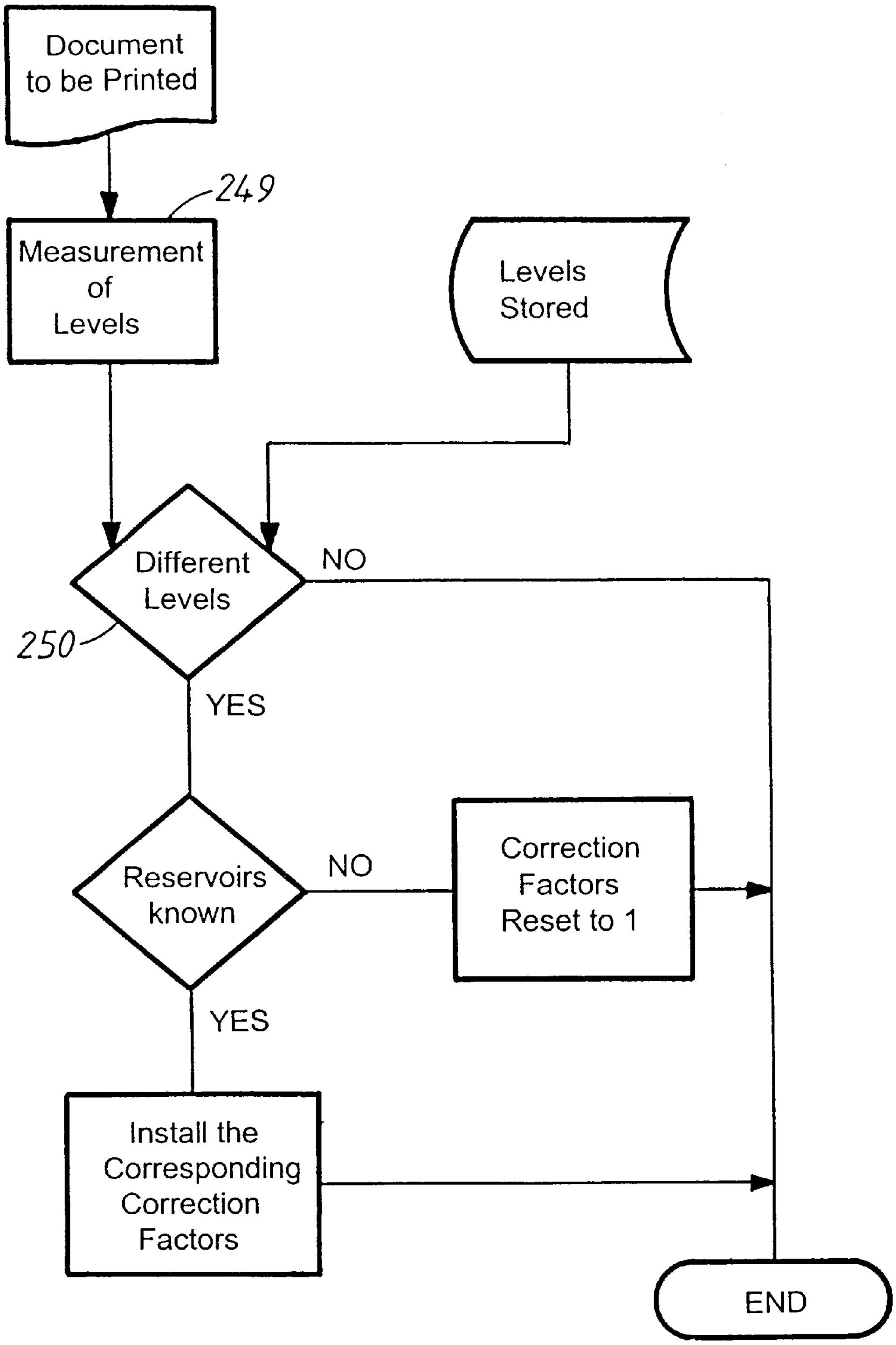
FIG. 9 is a flow diagram describing the process of detecting the changes in reservoirs and recognition thereof.

FIG. 9 illustrates another possibility of managing printing product reservoirs which can be used in connection with the printer. For printing certain documents, the user may need to temporarily remove a printing product reservoir in order to replace it with another reservoir containing another printing product and meeting different requirements. In this case, the reservoir which was temporarily removed is not generally completely empty and can be reused subsequently. The invention makes provision for reserving a sufficient memory capacity in the computer for storing the information representing the quantities of printing product contained in several interchangeable reservoirs, that is to say several reservoirs able to occupy the same place on the printing carriage. In practice, it is for example possible to decide to store the levels of the last ten non-empty reservoirs which have been used at each reservoir location in the printer. The data processing illustrated by FIG. 9 can be triggered by a periodic instruction or each time it is wished to print a document. In this case, the available quantities in all the reservoirs in the printer are measured and naturally stored (step 249). At step 250, the available quantities are compared with those which are stored lastly, that is to say those which result from the series of measurements performed after the last printing of a document. If the result of test 250 is negative, this means that no reservoir has changed in the meantime. The monitoring process is then ended. If the response is positive, stored levels of the reservoirs previously used are sought in the memory if at least one of the reservoirs, whose level has changed, can be identified as a known reservoir already used. If the response is yes, the corresponding correction factors which were calculated lastly for this reservoir or reservoirs already partly used are installed in the system. If the response is negative, this means that the changed reservoir or reservoirs have never been used and, in this case, a correction factor equal to 1 is allocated to them, after which the monitoring process is terminated and the system is ready to print new documents under optimum conditions.

Figure 10:
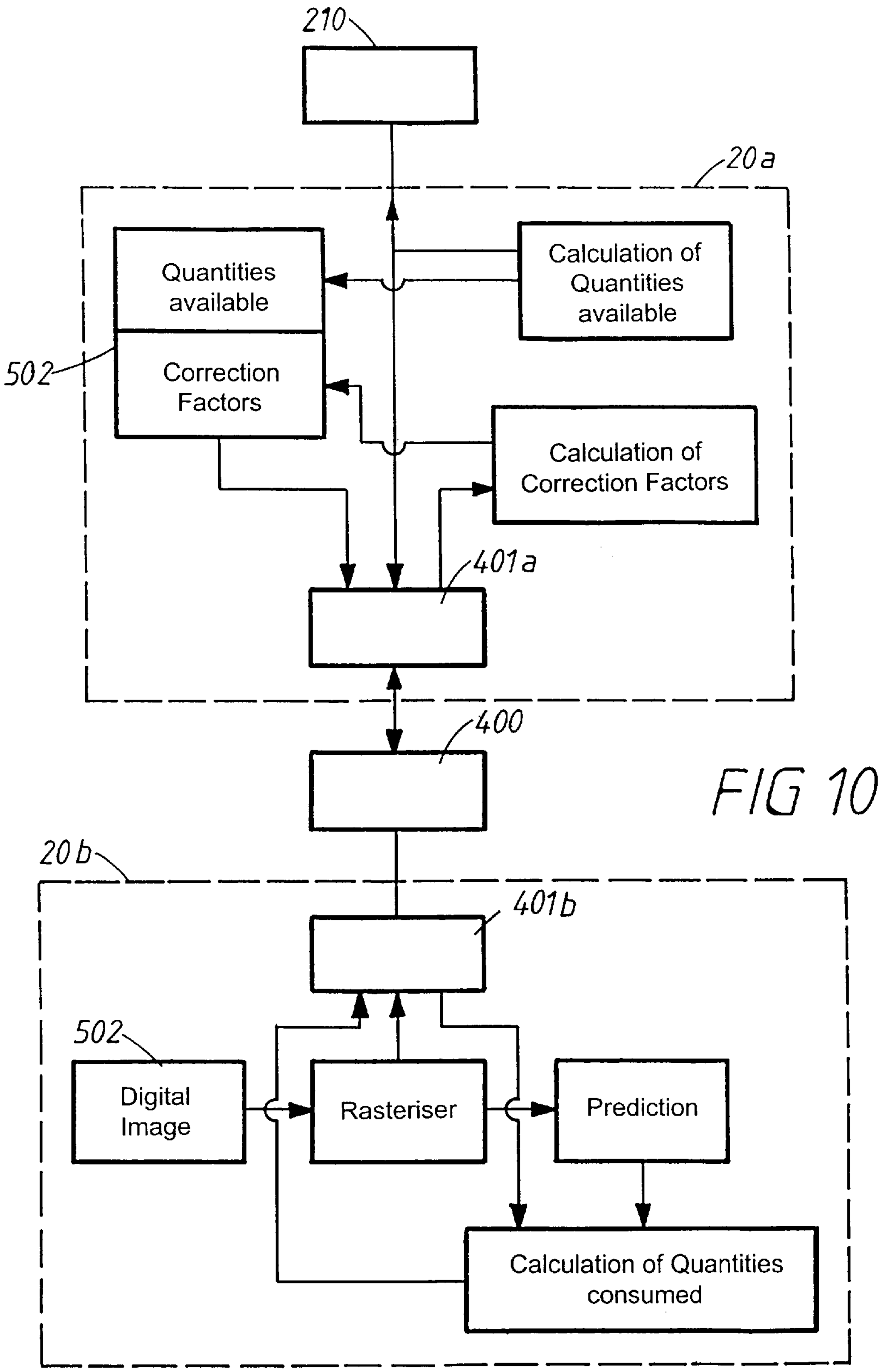
FIG. 10 is a block diagram illustrating a network connection of several computers, one of them being connected to a printer.

FIG. 10 is a block diagram illustrating the implementation of the invention using a printer 210 connected to a first computer 20*a* connected to one or more other computers by a network 400. Amongst these computers, a second computer 20*b* is depicted which has the particularity of containing a document stored in the form of digital data. It is assumed that the computer 20*b* has no printer and that the user wishes to print the document from the printer 210 connected to the first computer 20*a*. Each computer is connected to the network 400 by a server 401*a*, 401*b* respectively. It is indicated in each computer 20*a*, 20*b* which are the parts which it contains or the operations which it is able to perform in order to obtain the result, namely the actual printing of the document on the printer 210 and the updating of the levels and correction factors.

The computer 20*a* stores the available quantities of printing product in the different reservoirs. It calculates and stores the correction factors. It controls the measurements of levels. The data stored in this memory 502 can be communicated to the computer 20*b* via the network 400.

For its part, the computer 20*b* has notably in its memory 502 the digital information representing the image to be printed. It also contains the software for rasterising the image and predicting the quantities of printing product necessary (FIGS. 2 and 3). It also contains software for calculating the quantities consumed. For implementing these calculations, it receives, via the network, the values of the correction factors and available quantities. Naturally, the distribution of the tasks between the computers, as has just been briefly described above, is only one advantageous example. Some of the operations performed by the computer 20*b* can be performed by the computer 20*a* or vice versa. For example, it is possible to entrust the calculation of the correction factors to the computer 20*b*.

Naturally, the invention also relates to any device (that is to say any appliance or set of appliances connected together) having means for implementing the method described above. These means have been described here with reference to FIGS. 1, 2, 4, 5 and 10. In this case, such a device can consist of at least one computer and a printer, or even two computers connected in a network with at least one printer.

The invention covers any storage means such as a magnetic tape, diskette, CD-ROM (fixed-memory compact disc) or rewriteable compact disc, integrated or not into the device, possibly removable, provided that it contains a program implementing, at least partially, the method described. Such a storage means can be read by a computer or a microprocessor for implementing the method.

What is claimed is:

1. Method of managing resources of at least one printing product available in a printer, characterised in that said method comprises the steps of:

predicting (100) a quantity of a printing product necessary for printing a document by a computer connected to the printer, wherein said predicting step includes creating a table (T) describing at least part of a monochromatic component of the document, the component corresponding to the printing product and each cell in the table representing a pixel, counting (6) a number of switched-on pixels in the table and deriving therefrom the necessary quantity (10) of the printing product, and wherein a table (107) is created with a limited capacity, less than a necessary capacity for describing the monochromatic component of the document, in that groups of pixels of the monochromatic component of the document are entered therein successively, and in that on each occasion a number of switched-on pixels is counted (114) until all the monochromatic component of the document has been entered in the table and its switched-on pixels have been counted;

creating each table of limited capacity from digital data representing adjacent bands (107, 118) of the document;

measuring (315), with quantity detection means, before printing the document, a quantity of printing product still available in a corresponding reservoir of the printer;

comparing the predicted quantity and the measured quantity; and, if the measured quantity is lower than the predicted quantity, sending (220, 230, 503) a message and/or triggering implementation of a processing before printing the document, wherein overlapping broadened bands (107, 118) are selected, in that, using corresponding digital data, at least one enlarged table is created, allowing an image reprocessing entailing a modification of the switched-on pixels, in that the table is modified by applying a known correction algorithm (111), and in that counting of the switched-on pixels corresponding to an excess part of the enlarged table is excluded.

2. Method according to claim 1 for colour printing, characterised in that as many enlarged tables (T, 103) are created as there are colours, each describing a monochromatic component of the document, in that a correction algorithm (111) is applied to all the tables before separately effecting counting of switched-on pixels in each table for predicting different quantities of printing products required, of all the colours concerned.

3. Method according to claim 1, characterised in that said method includes a calculation step (6, 10) of multiplying the number of switched-on pixels by a value representing an elementary quantity of the printing product.

4. Method according to claim 1, further comprising the step of allocating (E 256) a correction factor to a quantity or quantities of printing product predicted for printing a document, respectively, comparing, after printing the document, the predicted quantity or quantities with a quantity or quantities of products actually consumed, respectively, reupdating the correction factor or factors (502) in order to cause the predicted quantity or quantities to correspond to the quantity or quantities consumed, and using a new correction factor or factors for a following prediction.

5. Method according to claim 4, further comprising the step of effecting a measurement (315) of the quantity or quantities of printing product available before printing, renewing this measurement or measurements after printing the document, and deriving therefrom the quantity or quantities of printing product actually consumed (E 255).

6. Method according to claim 5, characterised in that said method is partly implemented in a first computer connected to a printer and partly implemented in a second computer connected by network to the first computer and storing in memory a document to be printed, and that the first computer (20*a*) contains in memory (502) the quantity or quantities of printing product still available and the correction factor or factors, and in that the first computer implements operations for measuring the quantity or quantities of printing product available as well as operations for updating the corresponding correction factors and operations for transmitting data contained in the memory to the second computer, and in that the second computer (20*b*) implements operations for predicting the quantity or quantities of printing product for printing the document, operations for producing information necessary to print the document, and operations for transmitting the information to the printer via the network and the first computer.

7. Method according to claim 5, further comprising the step of storing quantities of printing products contained in several interchangeable reservoirs together with corresponding correction factors, measuring a quantity or quantities of available printing product, comparing the stored quantities or quantities with the measured quantity or quantities and, if at least one difference appears, determining whether the measured quantities or quantities correspond to a reservoir or cartridge already used and, if affirmative, reusing the corresponding correction factor or factors.

8. Method according to claim 5, characterised in that said method is partly implemented in a first computer connected to a printer and partly implemented in a second computer connected by network to the first computer and storing in memory a document to be printed, and that the first computer contains in memory the quantity or quantities of printing product still available and the correction factors or factors, and in that the first computer implements operations for measuring the quantity or quantities of printing product available as well as operations for updating the corresponding correction factors and operations for transmitting data contained in the memory to the second computer, and in that the second computer implements operations for predicting the quantity or quantities of printing product for printing the document, operations for producing information necessary to print the document, and operations for transmitting the information to the printer via the network and the first computer.

9. Method according to claim 4, further comprising the steps of storing quantities of printing products contained in several interchangeable reservoirs together with corresponding correction factors, measuring a quantity or quantities of available printing product (249), comparing (250) the stored quantity or quantities with a corresponding measured quantity or quantities and, if at least one difference appears, determining whether the measured quantity or quantities correspond to a reservoir or cartridge already used and, if affirmative, reusing the corresponding correction factor or factors, wherein said method is partly implemented in a first computer connected to a printer and partly implemented in a second computer connected by network to the first computer and storing in memory a document to be printed, and that the first computer contains in memory the quantity or quantities of printing product still available and the correction factors or factors, and in that the first computer implements operations for measuring the quantity or quantities of printing product available as well as operations for updating the corresponding correction factors and operations for transmitting data contained in the memory to the second computer, and in that the second computer implements operations for predicting the quantity or quantities of printing product for printing the document, operations for producing information necessary to print the document, and operations for transmitting the information to the printer via the network and the first computer.

10. Method according to claim 1, further comprising the steps of, from a quantity or quantities of printing product predicted for printing a document (E 260) and from a measurement or measurements of corresponding printing product, determining (E 262) whether at least one copy of the document can be printed without exhaustion of at least one printing product required, and displaying and/or broadcasting a corresponding item of information.

11. Method according to claim 10, further comprising the steps of, from the quantity or quantities of printing product predicted for printing a document (E 260) and the measurement or measurements (E 262) of corresponding printing product, determining a number of copies of the document that can be printed (E 262) before exhaustion of at least one printing product required, and displaying and/or broadcasting a corresponding item of information.

12. Method according to claim 11, further comprising the step of storing quantities of printing products contained in several interchangeable reservoirs together with corresponding correction factors, measuring a quantity or quantities of available printing product, comparing the stored quantities or quantities with the measured quantity or quantities and, if at least one difference appears, determining whether the measured quantities or quantities correspond to a reservoir or cartridge already used and, if affirmative, reusing the corresponding correction factor or factors.

13. Method according to claim 11, characterised in that said method is partly implemented in a first computer connected to a printer and partly implemented in a second computer connected by network to the first computer and storing in memory a document to be printed, and that the first computer contains in memory the quantity or quantities of printing product still available and the correction factors or factors, and in that the first computer implements operations for measuring the quantity or quantities of printing product available as well as operations for updating the corresponding correction factors and operations for transmitting data contained in the memory to the second computer, and in that the second computer implements operations for predicting the quantity or quantities of printing product for printing the document, operations for producing information necessary to print the document, and operations for transmitting the information to the printer via the network and the first computer.

14. Method according to claim 10, characterised in that said method is partly implemented in a first computer connected to a printer and partly implemented in a second computer connected by network to the first computer and storing in memory a document to be printed, and that the first computer contains in memory the quantity or quantities of printing product still available and the correction factors or factors, and in that the first computer implements operations for measuring the quantity or quantities of printing product available as well as operations for updating the corresponding correction factors and operations for transmitting data contained in the memory to the second computer, and in that the second computer implements operations for predicting the quantity or quantities of printing product for printing the document, operations for producing information necessary to print the document and operations for transmitting the information to the printer via the network and the first computer.

15. Method according to claim 10, further comprising the step of storing quantities of printing products contained in several interchangeable reservoirs together with corresponding correction factors, measuring a quantity or quantities of available printing product, comparing the stored quantities or quantities with the measured quantity or quantities and, if at least one difference appears, determining whether the measured quantities or quantities correspond to a reservoir or cartridge already used and, if affirmative, reusing the corresponding correction factor or factors.

16. Method according to claim 1, characterised in that said method is implemented at least partly in a first computer (20, 20*a*) connected to a printer and partly implemented in a second computer connected by network to the first computer and storing in memory a document to be printed, and that the first computer contains in memory the quantity or quantities of printing product still available and the correction factors or factors, and in that the first computer implements operations for measuring the quantity or quantities of printing product available as well as operations for updating the corresponding correction factors and operations for transmitting data contained in the memory to the second computer, and in that the second computer implements operations for predicting the quantity or quantities of printing product for printing the document, operations for producing information necessary to print the document, and operations for transmitting the information to the printer via the network and the first computer.

17. Device for managing resources of at least one printing product available in a printer, characterised in that said device comprises:

prediction means (100) for predicting a quantity of a printing product necessary for printing a document by a computer connected to the printer, wherein said prediction means includes means for creating a table (T) describing at least part of a monochromatic component of the document, the component corresponding to the printing product and each cell in the table representing a pixel, means for counting (6) a number of switched-on pixels in the table, and means for deriving therefrom the necessary quantity (10) of the printing product;

means for creating a table (107) of limited capacity, less than a necessary capacity for describing the monochromatic component of the document;

means for successively entering groups of pixels of the monochromatic component of the document in the table;

means for on each occasion counting (114) the number of switched-on pixels until all of the monochromatic component of the document has been entered in the table and the switched-on pixels have been counted;

means for creating each limited-capacity table from digital data representing adjacent bands (107, 118) of the document;

means for selecting overlapping broadened bands (107, 118);

means for creating at least one enlarged table from corresponding digital data, allowing an image reprocessing entailing a modification of the switched-on pixels;

means for modifying the table by applying a known correction algorithm (111);

means for excluding counting of switched-on pixels corresponding to an excess part of the enlarged table;

quantity detection means (315) for measuring, before printing the document, a quantity of printing product still available in a corresponding reservoir of the printer;

comparison means for comparing the predicted quantity and the measured quantity; and transmission means for, if the measured quantity is lower than the predicted quantity, sending (220, 230, 503) a message and/or triggering implementation of a processing before printing the document.

18. Device according to claim 17 for colour printing, further comprising means for creating as many enlarged tables (T, 103) as there are colours, each describing a monochromatic component of the document, means for applying a correction algorithm (111) to all the tables, and means for separately effecting counting of switched-on pixels of each table for predicting different quantities of required printing products, of all the colours concerned.

19. Device according to claim 17, characterised in that said quantity detection means includes a capacitive arm, which includes the reservoir (312), means for applying an alternating signal (317) to the capacitive arm, and means for analysing a resulting signal in order to derive therefrom the quantity of printing product still available.

20. Device according to claim 17, further comprising:

means for allocating (E 256) a correction factor to a quantity or quantities of printing products predicted for printing a document, respectively, means for comparing, after printing the document, the predicted quantity or quantities with a quantity or quantities of products actually consumed, respectively, means for reupdating the correction factor or factors (502) in order to cause the predicted quantity or quantities to correspond to the consumed quantity or quantities, means for using a new correction factor or factors for a following prediction, means for storing quantities of printing products contained in several interchangeable reservoirs, means for storing corresponding correction factors, means for comparing (250) the stored quantity or quantities with a corresponding measured quantity or quantities, and means for re-employing correction factors already stored, according to a comparison result, wherein said device includes a first computer connected to a printer and a second computer connected by network to the first computer and storing in memory a document to be printed, and that the first computer contains in memory the quantity or quantities of printing product still available and the correction factor or factors, and in that the first computer includes means for implementing operations for measuring the quantity or quantities of available printing product as well as operations for updating the corresponding correction factors and operations for transmitting data contained in the memory to the second computer, and in that the second computer includes means for implementing operations for predicting the quantity or quantities of printing products for printing the document, operations for producing information necessary to print the document, and operations for transmitting the information to the printer via the network and the first computer.

21. Device according to claim 17, further comprising means for determining (E 262) whether at least one copy of the document can be printed without exhaustion of at least one necessary printing product, from the quantity or quantities of printing product predicted for printing a document (260) and from a measurement or measurements of corresponding printing product, and means for displaying and/or broadcasting corresponding information.

22. Device according to claim 21, further comprising means for determining a number of copies of the document that can be printed (E 262) before exhaustion of at least one necessary printing product, from the quantity or quantities of printing product predicted for printing a document (E 260) and a measurement or measurements (E 262) of corresponding printing product, and means for displaying and/or broadcasting corresponding information.

23. Device according to claim 22, further comprising means for storing quantities of printing products contained in several interchangeable reservoirs, means for storing corresponding correction factors, means for comparing the stored quantity or quantities with a corresponding measured quantity or quantities, and means for re-employing correction factors already stored, according to a comparison result.

24. Device according to claim 22, characterised in that said device includes a first computer connected to a printer and a second computer connected by network to the first computer and storing in memory a document to be printed, and that the first computer contains in memory the quantity or quantities of printing product still available and the correction factor or factors, and in that the first computer includes means for implementing operations for measuring the quantity or quantities of available printing product as well as operations for updating the corresponding correction factors and operations for transmitting data contained in the memory to the second computer, and in that the second computer includes means for implementing operations for predicting the quantity or quantities of printing products for printing the document, operations for producing information necessary to print the document, and operations for transmitting the information to the printer via the network and the first computer.

25. Device according to claim 21, characterised in that said device includes a first computer connected to a printer and a second computer connected by network to the first computer and storing in memory a document to be printer, and that the first computer (20*a*) contains in memory (502) the quantity or quantities of printing product still available and the correction factor or factors, and in that the first computer includes means for implementing operations of measuring the quantity or quantities of available printing product as well as operations for updating the corresponding correction factors and operations for transmitting data contained in the memory to the second computer, and in that the second computer (20*b*) includes means for implementing operations of predicting the quantity or quantities of printing products for printing the document, operations for producing information necessary to print the document, and operations for transmitting the information to the printer via the network and the first computer.

26. Device according to claim 21, characterised in that said device includes a first computer connected to a printer and a second computer connected by network to the first computer and storing in memory a document to be printed, and that the first computer contains in memory the quantity or quantities of printing product still available and the correction factor or factors, and in that the first computer includes means for implementing operations for measuring the quantity or quantities of available printing product as well as operations for updating the corresponding correction factors and operations for transmitting data contained in the memory to the second computer, and in that the second computer (20*b*) includes means for implementing operations for predicting the quantity or quantities of printing products for printing the document, operations for producing information necessary to print the document, and operations for transmitting the information to the printer via the network and the first computer.

27. Device according to claim 17, characterised in that said device includes at least partly a first computer (20*a*) connected to a printer and a second computer (20*b*) connected by network to the first computer and storing in memory a document to be printed (502), and that the first computer contains in memory the quantity or quantities of printing product still available and the correction factor or factors, and in that the first computer includes means for implementing operations for measuring the quantity or quantities of available printing product as well as operations for updating the corresponding correction factors and operations for transmitting data contained in the memory to the second computer, and in that the second computer includes means for implementing operations for predicting the quantity or quantities of printing products for printing the document, operations for producing information necessary to print the document, and operations for transmitting the information to the printer via the network and the first computer.

28. Device according to claim 21, further comprising means for storing quantities of printing products contained in several interchangeable reservoirs, means for storing corresponding correction factors, means for comparing the stored quantity or quantities with a corresponding measured quantity or quantities, and means for re-employing correction factors already stored, according to a comparison result.

* * * * *

UNITED STATES PATENT AND TRADEMARK OFFICE
CERTIFICATE OF CORRECTION

PATENT NO. : 6,791,704 B1
DATED : September 14, 2004
INVENTOR(S) : Jean-Jacques Moreau et al.

It is certified that error appears in the above-identified patent and that said Letters Patent is hereby corrected as shown below:

Column 3,
Line 13, "etc)" should read -- etc.) --.

Column 5,
Line 48, "possibly" should read -- possible --.

Column 6,
Line 22, "programme" should read -- program --.

Column 7,
Line 50, "etc" should read -- etc. --.

Column 9,
Line 64, "programmed" should read -- programed --.

Column 10,
Line 32, "show" should read -- shown --.

Column 13,
Line 62, "printer;" should read -- printer; and --.

Column 14,
Line 9, "claim 1" should read -- claim 1, --; and "colour" should read -- color --.
Line 11, "colours," should read -- colors, --.
Line 16, "colours" should read -- colors --.

Column 17,
Line 49, "claim 17" should read -- claim 17, --; and "colour" should read -- color --.
Line 51, "colours," should read -- colors, --.
Line 56, "colours" should read -- colors --.
Line 61, "analysing" should read -- analyzing --.
Line 67, "respectively," should read -- respectively; --.

UNITED STATES PATENT AND TRADEMARK OFFICE

CERTIFICATE OF CORRECTION

PATENT NO. : 6,791,704 B1
DATED : September 14, 2004
INVENTOR(S) : Jean-Jacques Moreau et al.

It is certified that error appears in the above-identified patent and that said Letters Patent is hereby corrected as shown below:

Column 18,
Line 3, ““respectively,” should read -- respectively; --.
Line 6, “quantities,” should read -- quantities; --.
Line 8, “prediction, means” should read -- prediction; ¶ means --.
Line 10, “reservoirs,” should read -- reservoirs; --.
Line 11, “factors,” should read -- factors; --.
Line 14, “quantities,” should read -- quantities; --.

Column 19,
Line 13, “printer,” should read -- printed, --.

Signed and Sealed this

First Day of February, 2005

JON W. DUDAS
*Director of the United States Patent and Trademark Office*